Oct. 8, 1957    R. G. VYVERBERG    2,809,294
XERORADIOGRAPHIC PLATES OR ELEMENTS
Filed Dec. 23, 1954    2 Sheets-Sheet 1
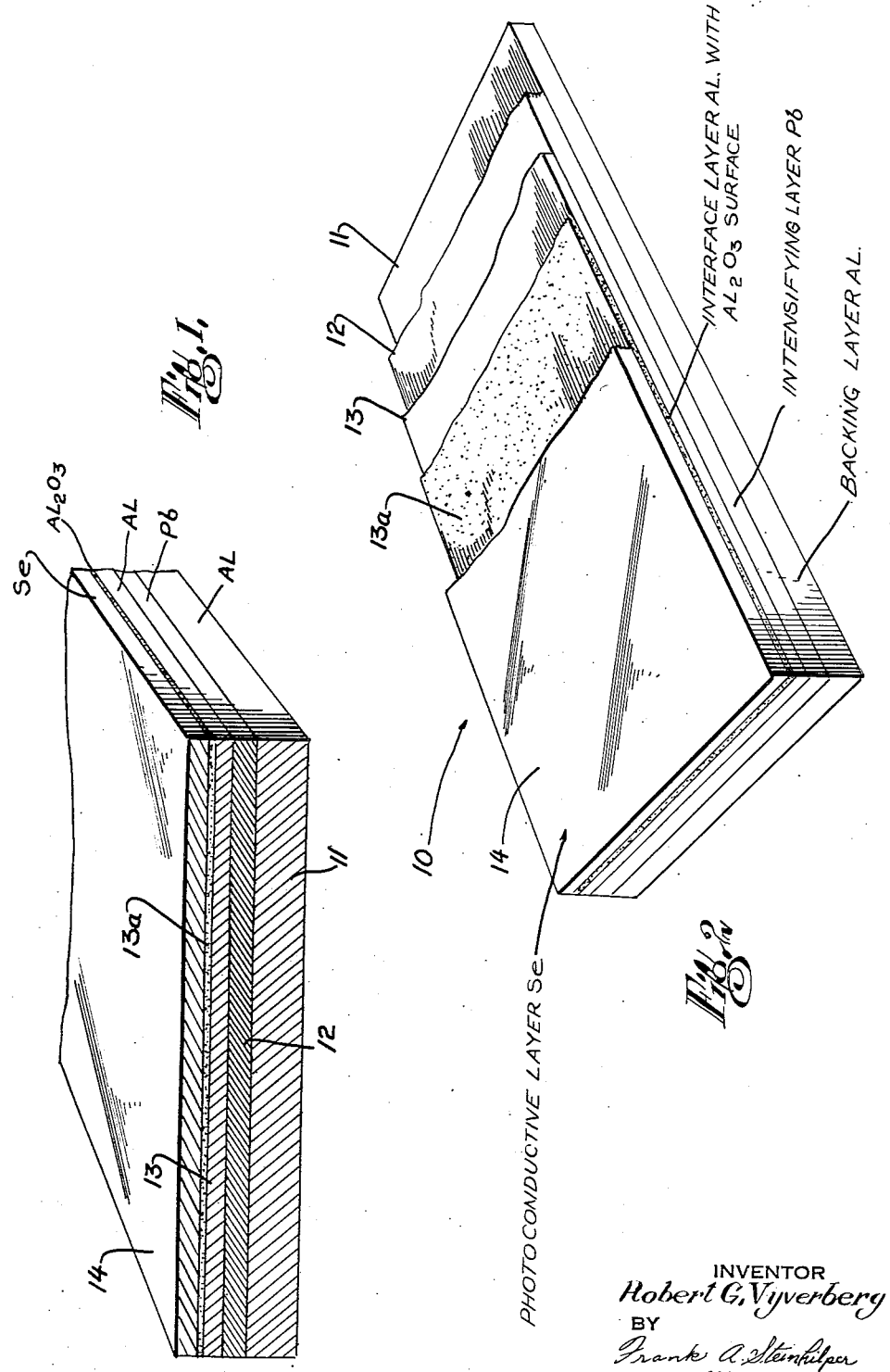
INVENTOR
Robert G. Vyverberg
BY
Frank A. Steinhilper
ATTORNEY Oct. 8, 1957  R. G. VYVERBERG  2,809,294
XERORADIOGRAPHIC PLATES OR ELEMENTS
Filed Dec. 23, 1954  2 Sheets-Sheet 2
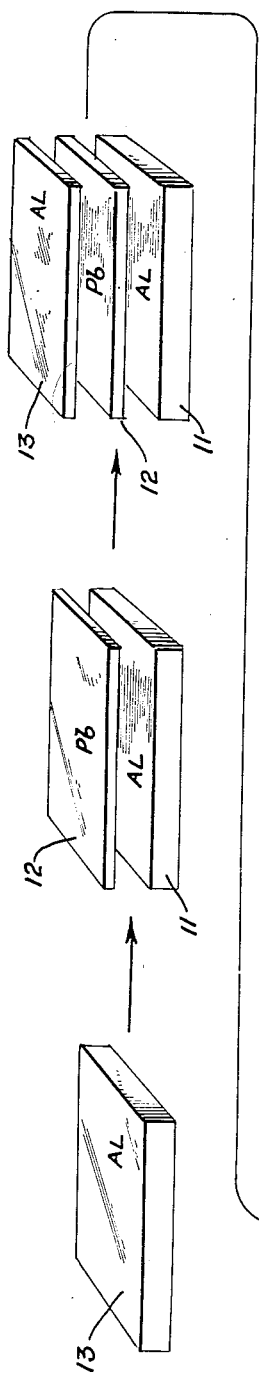
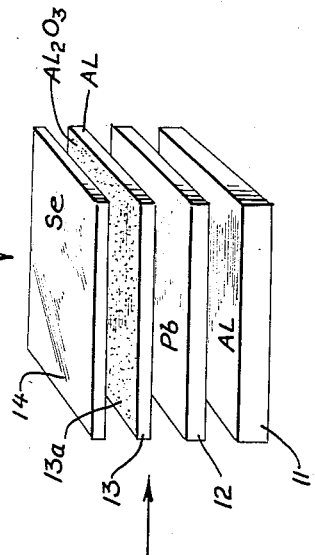
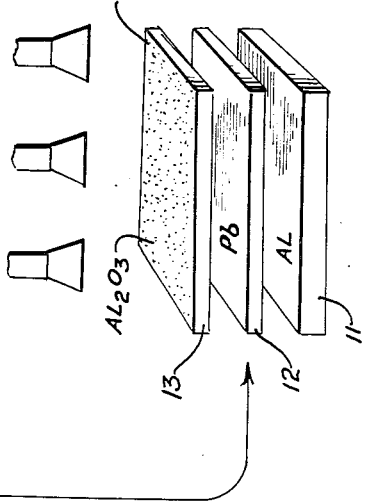
INVENTOR
Robert G. Vyverberg
BY
Frank A. Steinhilper
ATTORNEY

United States Patent Office 2,809,294
Patented Oct. 8, 1957

2,809,294

XERORADIOGRAPHIC PLATES OR ELEMENTS

Robert G. Vyverberg, Pittsford, N. Y., assignor to The Haloid Company, Rochester, N. Y., a corporation of New York Application December 23, 1954, Serial No. 477,219

3 Claims. (Cl. 250—65)

This invention relates to xeroradiography and more particularly to xeroradiographic plates or elements and to a method for producing the latter.

Xeroradiographic plates comprising a conductive metallic plate provided with an adherent coating of vitreous or amorphous selenium have been utilized in radiographic work. When an electric charge is placed on the coating, the later will act as an electrical insulator to the charge in the dark, and as an electrical conductor to the charge on exposure to penetrating radiation such as that of X-rays, gamma rays, grenz rays or the like. It is possible, therefore, to secure an electrostatic latent image of an object on the coating by interposing the object in the path of the radiation beam from its source to the coating for a determined exposure time, this will produce a condition on the sensitive surface of the coating wherein those areas which have been subjected to high intensities of the radiations will become discharged, while other areas will be only partially discharged in accordance with the amount of penetrating radiation which has struck there. Since the amount of energy reaching the surface will depend upon the amount absorbed by the object being radiographed, and since the amount so absorbed will be related to the thickness of the object at various points, to its composition, etc., it will be apparent that a charge pattern will be formed on the sensitive surface wherein the charge pattern conforms to a positive latent image of the object being radiographed. The electrostatic latent image produced on the coating resembles a shadow picture of the object. This latent image is then developed to make a visible picture, for example, in one of the ways described in Carlson Patent No. 2,297,691 issued October 6, 1942, or in Schaffert et al. Patent No. 2,666,144 issued January 12, 1954. For example, the latent image may be developed by sprinkling the exposed coating surface in the dark with a fine dust or powder which distributes itself on said surface in accord with the image pattern of the residual electric charge on the layer. The dusted coating is then subjected to a gentle draft of air to blow off all loose powder not held on the coating surface by electrostatic attraction.

Wherever an electric charge remains on the surface, the powder remains adhering to the coating surface by electric attraction, thus making visible a visible picture on said coating surface of the latent electrostatic image.

This dust picture subsequently may be transferred in one of the ways described in said Carlson or Schaffert patents to produce a permanent record.

The production of images on plates or elements of the character described above by exposure to penetrating radiation such as that of X-rays or gamma rays, is found to be relatively slow, the required exposure time being fairly long. Moreover, the images produced are found to lack sufficient definition. Attempts at securing image definition improvement and shorter exposure time by increasing the energy of the X-rays led to difficulties. Not only do the X-rays more easily penetrate the object being radiographed, but, they also, more easily penetrate the plate or element. As X-rays must be absorbed if they are to affect the coating, mere increase in X-ray energy without providing some means for increasing the amount of energy absorbed by the coating serves no useful purpose.

One technique for increasing the absorbtion of high energy or high-voltage X-rays on the coating is by the use of intensifying screens of lead foil. This technique is readily available for use where the recording medium is photographic film. Use therewith of lead foil intensifying screens arranged in contact with the film is found to improve the photographic image materially and to reduce required exposure time. The action of these lead foil intensifying screens is generally threefold. Such screens absorb secondary and tertiary X-rays created within the object being radiographed and thereby improve definition of the image and increase image contrast. Such screens further absorb primary X-rays and create secondary X-rays having lower voltages than the primary beam. These secondary, lower energy X-rays are much more readily absorbed and detected by the film than are the high voltage X-rays. This generally decreases the exposure time needed. However, this effect is possible because of the close proximity of the lead intensifying screen to the film. In fact, actual contact between film and screens is necessary in order to obtain best results because the primary high voltage X-rays striking the lead foil screen cause the later to emit photoelectrons or beta particles. These, ejected from the lead are absorbed by the film and expose it in the same way as light or X-rays. These electrons like the secondary X-rays, are emitted in proportion to the intensity of the high-voltage X-rays striking the lead, causing the electrons to produce a valid picture of the object being radiographed. This beta particle emission is the most important of the threefold effects occurring when high voltage X-rays strike lead foil intensifying screens.

The net effect of such screens is reduction of exposure time by a factor of two or three. But, to obtain best results, the intensifying screens must be in contact with the film. Separating the intensifying screens from the film decreases image resolution and contrast, reduces intensifying action and increases exposure time.

Since contact between the screen and the recording surface is essential for maximum intensifying action, the use of an intensifying screen with xeroradiographic plates presents problems not encountered with ordinary photographic film. Among these problems is the difficulty of depositing a uniform smooth layer of selenium onto lead. A lead intensifying screen having a uniform smooth selenium coating is difficult to produce. To secure uniformity of deposition of the selenium layer it becomes necessary to provide appropriate ways of effecting smooth uniform deposition on the intensifying screen of the selenium coating. The provision of an appropriate interface layer between an intensifying screen and the radiation sensitive coating which will effectively permit appropriate deposition of the radiation sensitive coating or layer, and at the same time not materially impede the intensifying effect of the intensifying screen, and the manner of producing an xeroradiographic plate or element embodying both an intensifying screen and an interface layer in conjunction with the radiation sensitive coating or layer are among the principal objects and features of the instant invention.

Other objects and features of the invention are the provision of xeroradiographic plates or elements provided with built-in intensifying screens that can be effectively utilized in radiography to provide images of good resolution and contrast and whose necessary exposure time is materially less than that required with plates or elements lacking the construction and arrangement of this invention.

Other objects and features of the invention include novel processes for the production of xeroradiographic plates or elements embodying the characterizing features of the invention as hereinabove described.

Further objects and features of the invention will become apparent from the following specification and the accompanying drawing wherein:

Fig. 1 is a section through a xeroradiographic plate or element embodying the invention;

Fig. 2 is a perspective partially broken away view of the plate or element of Fig. 1 illustrating its component layers; and Fig. 3 diagrammatically illustrates the method of producing the plates or elements.

Referring to the drawing, the reference character 10 denotes generally a xeroradiographic plate or element embodying the invention. This plate or element 10 comprises a relatively thick base plate 11, preferably of aluminum. The thickness is sufficient to impart rigidity to the plate. Zinc, brass or other suitable metal also may be used. The upper surface of the base plate 11 is smooth. This surface is covered or coated with a layer 12 of heavy metal such as lead or possibly of gold. This layer 12 may be lead foil, gold foil or other heavy metal foil, or may be heavy metal deposited in other ways, and is preferably secured or adhered permanently to the surface of the base plate 11. With a lead foil the thickness of layer 12 ranges from .001 to .015 inch, depending upon the range of X-rays to be used with the plate or element 10.

A thin film or layer 13 of aluminum in a thickness of the order of from approximately 50 to approximately 10,000 Angstrom units is then applied to cover the upper surface of the lead layer 12. The application of the aluminum film or layer 13 is effected, for example, by sublimation and vapor deposition in vacuum onto the lead layer 12. Any other suitable mode of applying the film or layer 13 of aluminum to cover the lead layer 12 may be utilized. The exposed surface of aluminum layer or film 13 is then oxidized preferably by heating in air to temperatures below the melting point of the lead layer 12 thereby at least oxidizing the surface 13a of the aluminum layer 13 and converting said surface at least to aluminum oxide $Al_2O_3$. If the layer 13 is very thin, substantially all of it may become oxidized when heated in air. The layer 13 constitutes an interface layer which facilitates smooth uniform deposition of a selenium coating 14 thereon.

The layer 14 of semi-conductive material such as vitreous or amorphous selenium is then applied to cover the aluminum oxide surface 13a of layer 13. This semi-conductive layer 14 may be applied to the aluminum oxide layer 13 in any of the known ways as by sublimation and vapor deposition in vacuum, or, for example, in the manner described in Middleton et al. Patent No. 2,662,832. The thickness of the selenium layer 14 is regulated by the kilovolt peak (kvp.) range of the X-rays with which the plates or element 10 is intended to be used. For example, with 1000 kvp. X-rays, a selenium layer thickness of 80 microns has been found satisfactory. In other situations, selenium layers 50 microns thick are satisfactory. The aluminum oxide surface 13a of interface layer 13 is especially receptive to deposition thereon of a smooth uniform coating 14 of selenium.

The combined xeroradiographic element or plate 10 consisting of the backing layer 11 of aluminum and the successively superposed covering layers 12 of lead, interface layer 13 of aluminum with its aluminum oxide surface 13a, and 14 of semiconductive vitreous or amorphous selenium is of particular utility in xeroradiography. The built-in lead intensifying layer or screen 12 acts as an intensifier when the plate is exposed to penetrating radiations such as those from X-ray beams, producing a flux of secondary electrons which aid in securing effective image definition and in reducing necessary exposure time for the object being radiographed. The aluminum oxide surface 13a of the thin aluminum interface layer 13 between the lead layer 12 and the selenium layer 14 effectively provides for uniform deposition on the lead layer of a smooth coating 14 of selenium. Also the interface layer 13 does not affect the stability of the selenium layer 14. At the same time this interface layer 13 is thin enough so that it does not materially impede the intensifying effect of the intensifying lead layer 12. Sharp clearly defined images may therefore be secured by the use of the plates or elements 10 embodying the invention.

In addition, if the thick backing layer 11 is of aluminum, it does not attenuate the incident X-ray beam while giving needed rigidity to the plate or element 10 as a whole.

While the xeroradiographic plate or element 10 has been described particularly as including the interface layer 13 to facilitate application of a smooth uniform coating 14, it is to be understood that in cases where a smooth uniform coating of selenium or other semi-conductive material can be applied directly and successfully to an intensifying layer of heavy metal, the interface layer 13 may be eliminated.

While specific embodiments of the invention have been described, variations within the scope and spirit of the appended claims are possible and are contemplated. There is no intention, therefore, of limitation to the exact details shown and described.

What is claimed is:

1. A xeroradiographic element comprising a conductive backing support layer of substantially rigid aluminum, an intensifying layer of lead foil approximately .001 to .015 inch thick superposed upon the backing layer, a film-like interface layer of aluminum approximately 50–10,000 Angstrom units thick having an aluminum oxide surface superposed upon the lead intensifying layer, and a layer of photoconductive selenium superposed upon the aluminum oxide surface of the interface layer.

2. A xeroradiographic element comprising in a unitary structure a support layer, an intensifying layer of material of high atomic number overlying said support layer, a filmlike interface layer having an aluminum oxide surface approximately 50–10,000 Angstrom units thick overlying said intensifying layer, and a layer of photoconductive insulating material overlying said aluminum oxide surface.

3. A xeroradiographic element comprising in a unitary structure a rigid support layer, a metal intensifying layer of high atomic number overlying said support layer, a filmlike interface layer having a thickness of approximately 50–10,000 Angstrom units overlying said intensifying layer, and a layer of photoconductive insulating material overlying said interface layer, said interface layer being of a material which facilitates the deposition of a uniform layer of photoconductive insulating material thereon.

References Cited in the file of this patent

UNITED STATES PATENTS

| | | |
|---|---|---|
| 2,277,013 | Carlson | Mar. 17, 1942 |
| 2,336,815 | Tasker | Dec. 14, 1943 |
| 2,541,599 | Morrison | Feb. 13, 1951 |
| 2,666,144 | Schaffert et al. | Jan. 12, 1954 |

FOREIGN PATENTS

| | | |
|---|---|---|
| 143,261 | Great Britain | Oct. 14, 1920 |

OTHER REFERENCES

"New Developments in Xeroradiography," Non-Destructive Testing, Summer 1951, vol. 10, No. 1, pages 8–25; pages 15 and 22 particularly relied upon.